Patented May 24, 1938

2,118,091

UNITED STATES PATENT OFFICE 2,118,091

LUMINESCENT MATERIAL

Humboldt W. Leverenz, Collingswood, N. J., assignor to Radio Corporation of America, a corporation of Delaware No Drawing. Application February 29, 1936,
Serial No. 66,453

5 Claims. (Cl. 134—47)

This invention relates to a process for synthesizing luminescent materials and, in particular, is directed to producing luminescent materials of improved properties, and with the further advantage that the spectral luminosity of the resultant material may be controlled at the time of manufacture.

Luminescent materials, particularly those adapted to become excited under the influence of an electronic ray bombardment, such as a cathode ray beam in tubes used for television, oscillographs and other allied uses, have been known for some time. The luminescent materials most commonly used in this art and known to workers in the art have always had the drawback of not being capable of consistent reproduction with respect to their characteristic properties. That is to say, in the past the luminescent materials which were coated upon the electron tube to be subjected to the impact of the electron ray would vary from batch to batch, so that non-uniform characteristics of the resultant light spots were noticeable and objectionable. This objectionable property of the screen coatings previously used applies both to those luminescent materials found in nature and those materials synthesized in the laboratories and factories.

The present invention is concerned, however, with a new method and means of producing luminescent materials which may be applied to the viewing end of an electronic tube. The materials which are prepared according to my new method are of such type and characteristics that the materials are not only capable of being manufactured with identical characteristics, but which have improved luminescent properties when compared with the known luminescent materials. For example, one of the properties of the improved luminescent materials is that the material when prepared in accordance with the invention exhibits greater resistance to "burning", that is, the screen material exhibits longer life under cathode ray bombardment and still possesses high efficiency for converting the bombardment energy into radiant (luminescent) energy. The new material is also of invariant spectral distribution in contra-distinction to a spectral distribution which changes with time of bombardment or with the intensity of bombardment or time after cessation.

My present invention relates to a process of producing and/or preparing a luminescent material possessing the above characteristics. In addition, the process of manufacture results in the production of a luminescent material wherein the very valuable property of controlled spectral emission is established by the process of manufacture. In the past, luminescent materials have had a characteristic spectral distribution which was a function of the elements making up the material, and in this respect, the color of the emitted luminosity under cathode ray bombardment was fixed.

By my invention I have developed a luminescent material wherein it is possible to control the color of the emitted light over a wide spectral range, by merely changing the proportions of the elements entering into the composition of the final material and for the final heating temperatures of the material.

Accordingly, it is one of the purposes of my invention to provide a luminescent material whose spectral emission may be changed from one end of the spectrum to the other through all the intermediate positions thereof by changing the proportions of the materials entering into the synthesis of the finally prepared luminescent material.

Likewise it is one of the purposes of my invention to provide a luminescent material whose spectral emission may be changed from one end of the spectrum to the other through all the intermediate positions thereof, by controlling the temperature and duration of the heating of the luminescent product during its preparation.

A further object of my invention is to shift the emission spectrum from the violet and toward longer wave lengths up to and including the red end by isomorphic mutual replacements in the crystal lattice of the resultant luminescent material.

Another object of my invention is to prepare a material which will emit light of high intensity under cathode ray bombardment.

A still further object of my invention is to provide a process for synthesizing a luminescent material with invariant spectral distribution with regard to length of time of cathode ray bombardment.

A still further object of my invention is to provide a process whereby improved luminescent materials may be prepared with minimum expense but, nevertheless, possess the advantage of uniformly superior response characteristics.

Other objects and advantages of my invention will be immediately apparent to those skilled in the art upon reading the following description of my invention.

The luminescent material resulting from my invention is an ortho-silicate activated by manganese. In this material there is an isomorphic mutual replacement of beryllium and zinc, so that the material may properly be called manganese activated beryllium zinc ortho-silicate. In this material, the ratio between berryllium and zinc may be varied from 1000/1 to 1/1000, with the only requirement to be satisfied being that the molar sum of the beryllium and zinc shall be equal to 2 for each molal of silicon. Thus, a formula which is descriptive of a luminescent material possessing the above outlined characteristics, may be expressed as:—

$$x(Be)y(Zn)SiO_4.Mn$$

Following this formula the variables $x$ and $y$ may be such that $x/y$ may be varied from 1000/1 to 1/1000 where $x+y$ is maintained equal 2. The amount of manganese is approximately 0.006 molal with respect to the total metallic ion molality, but may be varied within wide limits, for example, between values of 0.1 molal to 0.0001 molal to alter the resultant intensity and color of my improved luminescent material.

In the course of preparing the material germanium may be substituted in whole or in part for the silicon. With such material and starting with the greatest ratio of zinc to beryllium, the color of the resultant luminosity under cathode ray bombardment will be a green blue. As the ratio of zinc to beryllium is made smaller and smaller, the color changes from green blue to green through yellow to orange red. Changing the amount of the activator manganese changes the color to almost as great a degree and controls to some extent, the intensity of the resultant luminosity and I have found that an optimum condition prevails when the amount of manganese is approximately .006 molal with respect to the total metallic ions molality. Increasing the final heating temperature also shifts the emission spectrum toward the red. Further shift toward the red may be obtained by substituting germanium for silicon.

This new material may be prepared by precipitating beryllium carbonate, zinc carbonate, and manganese carbonate, in chosen proportions from an exceedingly pure nitrate solution of these metals by adding exceedingly pure ammonium carbonate. The mixed material is then precipitated on and around very finely divided, exceedingly pure silica ($SiO_2$) particles. The silica particles may be provided in any suitable fashion such as a suspension or, if it is preferred, a colloidal suspension of silica may be used. Likewise, it is not necessary to use silica. Germanium may be substituted for silica and still give the superior luminescent materials which my invention provides. The precipitated mixture is then evaporated to dryness with stirring and heated for about one hour in a dry condition at heats varying between 700°–1600° C. in an electric furnace, with an optimum value of substantially 1150° C.

The steps in the process of mixing, precipitating, heating and final grinding the resulting luminescent material, as a ball-mill, for example, have already been described in detail by my co-pending application entitled "Process for synthesizing luminescent material", Serial No. 707,866, filed January 23, 1934, in which I have described the preparation of a manganese activated zinc ortho-silicate. For example, to prepare a luminescent material having 40 molal percent of beryllium and 60 molal percent of zinc (with respect to the total cation content) and activated with .006 molal manganese, the following procedure may be used:

Into a clean quartz beaker approximately four grams of purified anhydrous silicon dioxide is added. To this is added 26.3 ml of 2 molal beryllium nitrate of the greatest purity obtainable. There is further added to this 21.4 ml of 3.68 molal zinc nitrate prepared from spectroscopically pure New Jersey zinc. The mixture is boiled and stirred. When brought to a boil, there is added very slowly and carefully with plenty of agitation 70 ml of saturated (approximately 5 molal) ammonium carbonate solution. The contents of the beaker are then evaporated with stirring to dryness and then heated by any appropriate manner to red heat. The contents are then allowed to cool and ground and mixed with a quartz rod. Approximately 5½ grams of the resulting product is placed in a quartz crucible and added to it 1.66 ml of .2206 molal manganese nitrate of the greatest purity obtainable. 3 to 5 ml of quartz distilled water is then added, the exact quantity depending upon the amount required to make the mixture thoroughly wet. The crucible is then heated and the contents thereof stirred and then 3 ml of concentrated ammonium carbonate is added.

The contents of the crucible are then evaporated with stirring to dryness and upon cooling the contents are ground with a quartz rod. The contents are then transferred to a covered platinum crucible and heated to 1200° C. in a suitable furnace for about 60 minutes. The crucible is then removed and allowed to cool in the air. The final product is a lightly fritted, easily comminutable white cake which gives an intense pale, canary yellow cathodoluminescence. It will be appreciated that the values given above are for a 40% beryllium—60% zinc phosphor, but it should be noted that the proportions of beryllium and zinc nitrate may be varied so long as molal quantities are preserved in accordance with the conditions pointed out above, and of course, that the quantity of manganese nitrate may also be varied. In the preparation of a luminescent material, the various ingredients used must be of exceptional purity in order that the characteristics of the final product shall be under the operator's control. This particular feature has been clearly pointed out in my co-pending application referred to above.

It will be readily appreciated that my newly invented material—manganese activated beryllium zinc ortho-silicate—is an improvement over the now known manganese activated zinc ortho-silicate described in my co-pending application referred to above, since by making use of an isomorphic mutual replacement of beryllium and zinc, I can now shift the emission spectrum of the luminescent material from a violet end of the spectrum toward longer wave lengths with increasing amounts of substituted beryllium to orange red. It should be noted that this increase continues up to a point where almost pure manganese activated beryllium ortho-silicate is reached. Just before this point is reached, the color of the emitted light of the luminescent material under cathode ray bombardment appears to exhibit purplish hues.

It will be noted that in this process no halides and, in particular, no fluorides are used in the process of preparing the composition. Consequently, the necessity for providing platinum ware for use in preparation of my improved luminescent material is unnecessary. Therefore, it is readily seen that the cost of preparing such materials is materially reduced. It will be apparent from the foregoing that this composition of material described by the present invention, in addition to the property of having controlled spectral range, possesses the other desirable features of manganese activated zinc ortho-silicate, which have been enumerated in my co-pending application, referred to above, among which are high efficient emitting light of high intensity under cathode ray bombardment possessing an invariant spectral distribution with regard to the length of time of cathode ray bombardment, which has cheapness of preparation, controllable spectral emission, and precise spectral emission characteristics controlled by temperature and heating process.

Consequently, my improved process and material have made possible the production of television pictures of improved quality by providing a material which can be coated on the end wall of a cathode ray tube upon which the electro-optical representation is produced, since the color of the resulting luminescence may be controlled to give a cream color of high intensity.

It will be readily appreciated that reconstructed images on the end wall of the cathode ray tubes in cream color are preferable to the usual bluish green image, since people are accustomed to black and white pictures, and my new and improved material affords a very close approximation to this ideal, whereas the bluish green images produced by prior known phosphors are of the mark in this respect.

It will be understood that the luminescent material described above may be mixed with other phosphors to give white light. For example, by controlling the spectral emission of the manganese activated beryllium zinc ortho-silicate, the spectral emission can be made to supplement the spectral emission of any other phosphor or group of phosphors so as to give uniform spectral emission throughout the visible spectral. From this, it will be readily appreciated that the emitted light will then be white. For example, the manganese activated beryllium zinc ortho-silicate may be mixed with green willemite and the spectral emission of the resultant may be adjusted to be in the orange region. As will be readily appreciated, the spectral emissions are not one of a single frequency, but cover relatively wide bands containing red and yellow, but falling off toward the green. Spectral emission of the green willemite on the other hand, contains blue green and some yellow. Consequently, when the two materials are added together and bombarded by cathode rays, the two spectrums overlap sufficiently to produce substantially white light, since the emission is substantially constant over the entire visible spectrum.

If it is desired to accentuate any one part of the spectrum, the manganese activated beryllium zinc ortho-silicate spectral emission may be peaked in the desired region either by heat treatment or by choosing the suitable proportions between beryllium and zinc, or the activator manganese. If it is desired to increase the secondary emission of this material, the manganese activated beryllium zinc ortho-silicate which I have described, may be mixed with small amounts of barium, strontium, calcium, caesium, rubidium, lanthanum, cerium, thorium, any of their compounds, or other elements or their compounds, which have large ionic or atomic radii. In certain applications of luminescent material, it is desirable to have high secondary emission and by mixing small amounts of the above identified materials, this desirable feature can be readily obtained.

Having now described my invention, what I claim as new and desire to protect by Letters Patent is the following:

1. A luminescent material comprising a manganese activated beryllium zinc salt of an ortho-acid of an element in the fourth group of the periodic series.

2. A luminescent material comprising a manganese activated beryllium zinc salt of an ortho-acid of an element in the second series of the fourth group of the periodic series.

3. A luminescent material comprising a manganese activated beryllium zinc ortho-silicate.

4. A luminescent material comprising a manganese activated beryllium zinc ortho-germanate.

5. A luminescent material of high secondary electron emission, comprising a manganese activated beryllium zinc salt of an ortho-acid of an element in the fourth group of the periodic series, and an element having an atomic radius equal to or larger than thorium and a work function equal to or smaller than thorium.

HUMBOLDT W. LEVERENZ.